US011340104B2

(12) United States Patent
Moers

(10) Patent No.: US 11,340,104 B2
(45) Date of Patent: May 24, 2022

(54) SYRINGE WITH A VALVE IN A HOUSING FOR MEASURING CHEMICALS

(71) Applicant: Matthew Moers, Queens, NY (US)

(72) Inventor: Matthew Moers, Queens, NY (US)

( * ) Notice: Subject to any disclaimer, the term of this patent is extended or adjusted under 35 U.S.C. 154(b) by 90 days.

(21) Appl. No.: 16/922,055

(22) Filed: Jul. 7, 2020

(65) Prior Publication Data

US 2022/0011147 A1 Jan. 13, 2022

(51) Int. Cl.
*G01F 11/02* (2006.01)
*G01F 15/00* (2006.01)
*B33Y 80/00* (2015.01)
*A01M 1/20* (2006.01)

(52) U.S. Cl.
CPC ............ *G01F 15/005* (2013.01); *B33Y 80/00* (2014.12); *G01F 11/027* (2013.01); *G01F 11/028* (2013.01); *A01M 1/20* (2013.01)

(58) Field of Classification Search
CPC .... G01F 11/027; G01F 11/028; G01F 15/005; B33Y 80/00; A61M 39/223; A61M 5/204; A61J 1/2096; A61J 1/201; A61J 1/2062
USPC .............................. 604/411, 414, 82; 222/71
See application file for complete search history.

(56) References Cited

U.S. PATENT DOCUMENTS

| | | | |
|---|---|---|---|
| 1,071,890 A * | 9/1913 | Desmond | B05B 9/0822 222/401 |
| 1,559,978 A * | 11/1925 | Page | A61M 5/204 604/186 |
| 1,930,929 A * | 10/1933 | Eisenberg | A61M 5/31 604/183 |
| 2,062,285 A | 12/1936 | Bergman | |
| 2,372,469 A | 3/1945 | Beasley et al. | |
| 2,687,871 A * | 8/1954 | Krug | F16K 11/0833 251/181 |
| 2,854,027 A * | 9/1958 | Kaiser | F16K 27/062 137/625.41 |
| 3,203,455 A * | 8/1965 | Horabin | G01N 30/18 141/329 |
| 3,416,567 A | 12/1968 | Von Dardel et al. | |
| 3,747,812 A | 7/1973 | Karman et al. | |
| 3,831,816 A | 4/1974 | Pauliukonis | |
| 3,916,895 A | 11/1975 | Davis, Jr. | |
| 3,957,052 A | 5/1976 | Topham | |
| 3,978,846 A * | 9/1976 | Bailey | A61B 5/15003 600/575 |
| 4,941,883 A * | 7/1990 | Venturini | A61M 5/322 604/125 |
| 5,049,128 A | 9/1991 | Duquette | |
| 5,334,163 A * | 8/1994 | Sinnett | A61M 5/19 137/625.47 |

(Continued)

Primary Examiner — Charles P. Cheyney
(74) Attorney, Agent, or Firm — Law Offices of Leo Mikityanskiy, P.C.; Leonid Mikityanskiy

(57) ABSTRACT

A highly accurate and efficient syringe with a valve in a housing has a hollow syringe with a barrel and a hollow tip, a port on the side of the barrel near the hollow tip, and a valve connected to the barrel by the housing, which has a mouth connected to the barrel and a bottle cap suitable for securing to a bottle. The valve is in fluid communication with the barrel through the port and in fluid communication with a bottle of chemicals through the bottle cap end of the housing. The syringe with a valve in a housing is adapted to precisely draw and measure chemicals from a bottle and to precisely dispense the chemicals without spills or drips.

36 Claims, 6 Drawing Sheets

(56) References Cited

U.S. PATENT DOCUMENTS

| | | | |
|---|---|---|---|
| 5,882,343 A | 3/1999 | Wilson et al. | |
| 5,896,804 A | 4/1999 | Kimura et al. | |
| D412,205 S | 7/1999 | Duchon et al. | |
| 6,090,070 A * | 7/2000 | Hager | A61M 5/31595 604/131 |
| 6,099,502 A | 8/2000 | Duchon et al. | |
| 6,238,372 B1 * | 5/2001 | Zinger | A61J 1/2089 604/246 |
| 6,976,974 B2 * | 12/2005 | Houde | A61M 39/223 137/625.21 |
| 7,896,849 B2 * | 3/2011 | Delay | A61J 1/2096 604/181 |
| 8,317,741 B2 * | 11/2012 | Kraushaar | A61J 1/2096 604/82 |
| 8,353,859 B2 | 1/2013 | Derichs | |
| 8,840,593 B2 * | 9/2014 | Greter | B05C 17/00593 604/236 |
| 8,940,662 B2 | 1/2015 | Burke et al. | |
| 8,980,294 B2 | 3/2015 | Burke et al. | |
| 9,550,030 B2 * | 1/2017 | Zivkovic | A61M 5/3221 |
| 10,349,924 B2 * | 7/2019 | Golden | A61M 5/3134 |
| 10,971,260 B2 * | 4/2021 | Searle | G16H 20/17 |
| 11,103,641 B1 * | 8/2021 | Doubet | A61J 1/2096 |
| 2005/0267363 A1 | 12/2005 | Duchon et al. | |
| 2007/0088289 A1 | 4/2007 | Bargh | |
| 2009/0054834 A1 * | 2/2009 | Zinger | A61J 1/2089 604/84 |
| 2010/0082016 A1 * | 4/2010 | Graham | F16K 5/0647 604/537 |
| 2010/0274179 A1 | 10/2010 | Derichs | |
| 2014/0031763 A1 | 1/2014 | Soma et al. | |
| 2017/0224318 A1 | 8/2017 | Golden et al. | |
| 2018/0099791 A1 * | 4/2018 | Doornbos | A61J 1/1487 |

* cited by examiner

SYRINGE WITH A VALVE IN A HOUSING FOR MEASURING CHEMICALS

BACKGROUND

This invention relates to a novel syringe with a valve and method of use thereof. More specifically, the novel syringe with a valve according to the disclosure of the present invention is used for measuring chemicals easily, precisely, and without spills, including measuring chemical concentrate from a bottle. The valve is attached to the syringe by a casing or a housing, which is cooperatively shaped to replace the standard cap of a chemical bottle. The housing may be manufactured using commercial manufacturing methods known in the art, or the housing may be 3D printed to facilitate fast, custom manufacturing and accommodating a variety of shapes and sizes of the different valves. Printing it using a 3D printer also allows to quickly scale the housing to fit any bottle size that has liquids that need measuring.

Pests are a disease hazard and a nuisance, causing billions of dollars in financial damages to businesses and individuals every year. Early and regular treatment of the pest problem significantly reduces the chance of a recurring problem, minimizes financial damage and the overall impact to individuals and businesses, and minimizes the harmful side effects from treatment.

Pest control or extermination is frequently performed by application of liquid chemicals to the affected zones and areas. For ease of transporting and storage, chemicals are not sold as a ready solution because they would take up too much space. Most of the solution would be water, which is heavy. Therefore, most professional-grade chemicals for pest control and extermination are sold in concentrate bottles. Every time when the chemicals are needed, the pest control professional or exterminator must open a bottle of chemical concentrate (i.e., unscrew the cap) and pour the chemical concentrate out of the bottle to mix a solution. The process of opening the bottle and pouring out the noxious, hazardous concentrate is inherently unsafe because there are many ways in which the pest control professional may fumble the opening of the bottle, drop the bottle, pour too much chemical out, or cause leaks and drops on the side of the bottle if the professional does not tilt the bottle down and back just right. This increases spills and wastes chemicals, and it may needlessly subject the pest control professional to hazardous chemicals.

By mixing the chemical components directly and precisely, a correct mixture is obtained. In the commercial pest-control or extermination environment, it is undesirable to have a mixture that has a percentage of the required chemical concentrate that is too small because then the mixture will not have the desired pest-control effect. It is just as harmful to have a mixture that has too-high percentage of the chemical concentrate because that is wasteful, costly, and it may be harmful to the pest control professionals and their customers.

The existing chemical bottles for pest control applications also do not have any way to dispense precise amounts of chemicals—the pest control professional has to "eyeball" the amount of the chemicals while pouring from the bottles. The present invention, which includes a novel syringe with a valve, attached to the syringe by a custom housing, addresses the need and provides additional safety, ease of use and precision when used with a standard chemical concentrate bottle (such as a pesticide concentrate bottle). The housing is designed not only to securely connect the valve to the syringe, but also to replace the cap on the chemical bottle, eliminating hazardous and costly chemical leaks. The invention according to the disclosure of the present application will change the way chemical concentrates are stored and prepared, in the pest control and other industries.

Because the novel syringe, valve and housing replace the cap, there is no need to take the cap off every time the chemical concentrate needs to be measured. That eliminates accidental spills and improves the overall safety of the process. While fumbling with a bottle without a cap may lead to chemical damage to eyes and other vital organs of the user, accidentally fumbling with a chemical concentrate bottle equipped with the novel syringe, valve and housing of the present invention minimizes the chance of that happening. Additionally, the present invention makes the bottle safer to touch, whereas a conventional bottle would not be safe because it would have drip lines leaking on its sides after pouring chemicals.

DESCRIPTION OF PRIOR ART

The majority of pest control professionals use commercially-available bottles of chemical concentrate with caps, which need to be unscrewed to open the bottle. The professionals then pour out the chemical concentrate by hand, estimating the volume because there is no precise way to measure the quantity while pouring even if the chemical concentrate bottle has volume markings on the side, as some do, or a window at the top of the bottle that allows to measure the concentrate. However, the markings and windows are not precise, and they offer only a limited, estimated way to measure the chemicals while pouring them out.

Thus, the pest control or exterminating technician has to guess how much to pour into a tank for mixing. Additionally, these concentrates are frequently viscous, and sometimes non-transparent, so it is very difficult to pour or visually check and see the desired amount because the liquid sticks to the walls or the measuring cap. Therefore, it is very easy to pour too much, but when mixing small amounts of chemicals, this can make or break the effectiveness of the treatment and the chemical overhead over a long term because of increased expenses due to over-pouring.

Additionally, most chemical concentrate bottles and their caps are cheaply made, and the manufacturers are trying to save materials (mostly plastic) during the manufacture. Hence, the caps drip even when the bottles are closed tightly because the seal between the cap and the bottle mouth is poor. It is virtually impossible to eliminate drips and leaks, even when carefully wiping the bottles and tightly closing them, while using the bottle several times per call. This is, at least in part, due to the thick chemical concentrate being on the mouth/lip of the bottle and inside the cap that was just removed to pour the chemicals. Over multiple uses, the chemical residue builds up on the bottle and it becomes hazardous to touch or leave in a confined space.

What is needed is an efficient syringe with a valve, which may be attached to the chemical concentrate bottle by a housing, that allows taking a precise amount of the chemical concentrate from the bottle, without spilling any, and allows to pour the chemical concentrate from the syringe to mix the chemical solution for the pest control or extermination treatment, thus minimizing chemical waste, the risk for the professionals associated with spills and leaks, and using the device according to the disclosure of the present invention is much faster than the conventional method.

SUMMARY

This invention meets the current need for a superior syringe with a valve and a housing that houses the valve and interconnects the syringe and the chemical concentrate bottle. A novel syringe with a valve, attached to the syringe by a housing is provided. The syringe, valve, and housing are designed to replace the existing manufacturer's cap. The cap is unscrewed once when the bottle is opened. Then, the housing, which is of a cooperating size with the mouth of the bottle and has cooperating threading of the same size as the bottle mouth, is securely and firmly screwed onto the mouth of the bottle. The housing can be manufactured in many varying sizes to accommodate manufacturer's caps of different sizes. The housing contains a valve, which is preferably a manual valve known in the art, with the open/close positions reached by activating the valve and twisting it 90 degrees clockwise or counterclockwise to open or close. The valve is in fluid communication with the syringe, to which the housing containing the valve is also attached. The attachment of the housing to the syringe has to be watertight.

When the housing with the valve and the attached syringe is attached to (i.e., screwed on top of) the bottle, the entire package is watertight and can be transported and stored as such. There is no more need to take off the cap to pour the chemical concentrate. When the chemical concentrate is needed, the plunger of the syringe is depressed into its most downward position in the barrel, the valve is turned to be open versus the bottle. The user then closes the tip of the syringe with a cap, such as a regular snap-on cap or a cap using a Luer lock to allow the chemicals to be drawn into the syringe through the valve. The bottle is sufficiently tilted or turned upside down to allow the chemical concentrate to be in fluid communication with the valve, and the syringe plunger is then retracted back until a needed amount of chemicals is drawn into the syringe. The syringe preferably has notches or marks along its barrel to enable the professional to measure precise amounts of chemicals. The valve is then flipped into the closed position versus the bottle, and the plunger is depressed once again, pouring the chemical concentrate out of the tip of the barrel.

The present invention will measure and pour chemical concentrates to precise amounts, without the need of removing the cap every time you need to use it. There will be no need to worry about dripping chemicals during pouring, miss the measurement or touch the chemical bottle with a hazardous leak or drip on the side.

By mixing the chemical components precisely, a correct mixture is obtained. In the commercial pest-control environment, it is undesirable to have a mixture that has a percentage of the required chemical concentrate that is too small because then the mixture will not have the desired pest-control effect. It is just as harmful to have a mixture that has too-high percentage of the chemical concentrate because that is wasteful, costly, and it may be harmful to the pest control professionals and their customers.

The syringe can be plastic or polycarbonate, or any material sufficiently transparent to observe the chemical concentrate being drawn into the syringe and suitable to withstand the harsh chemicals.

Without departing from the scope and spirit of the present invention, the specific embodiment of the present invention may be adjusted as needed for a specific purpose within the scope of this disclosure.

DRAWINGS

These features, aspects and advantages of the novel syringe with a valve in a housing and method of use thereof will become further understood with reference to the following description and accompanying drawings where FIG. 1 is an isometric view of the syringe of the present invention with a valve in a housing connected to the syringe;

DESCRIPTION

Figure 1:
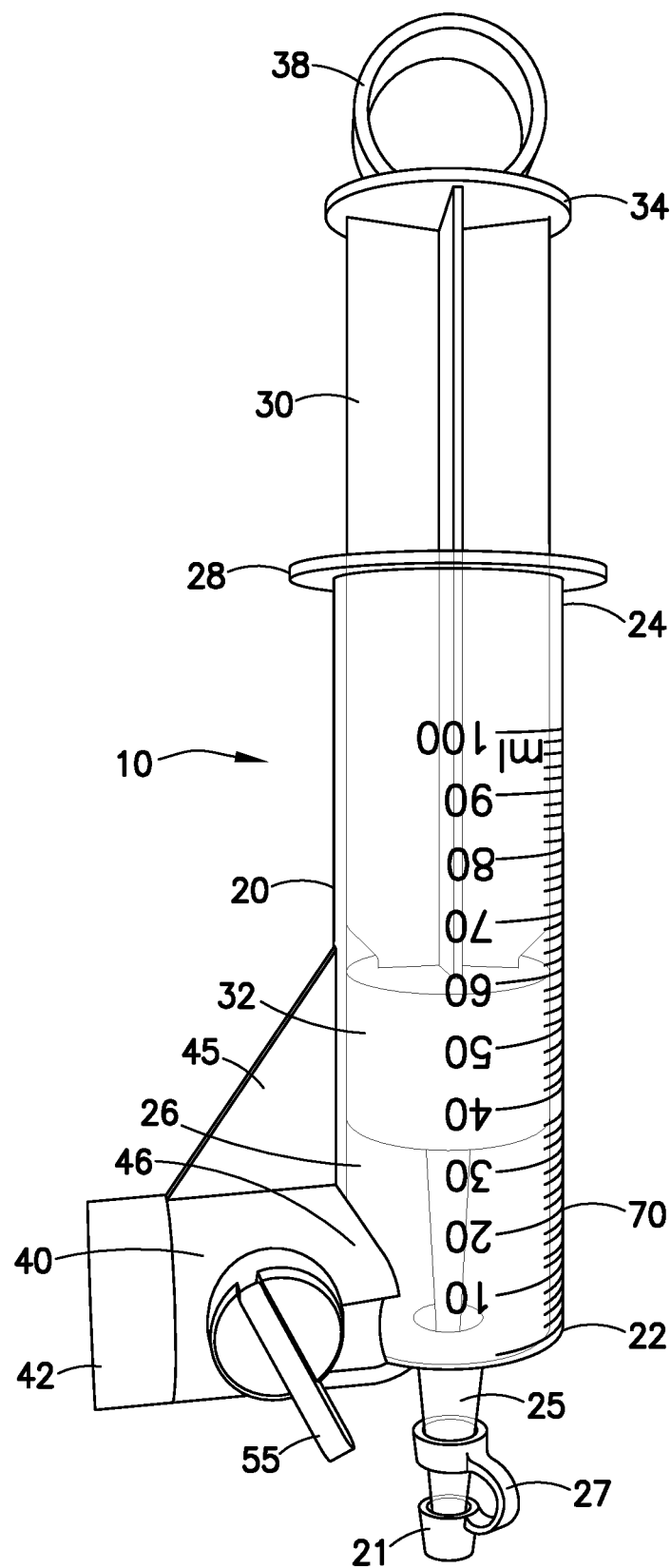
Figure 2:
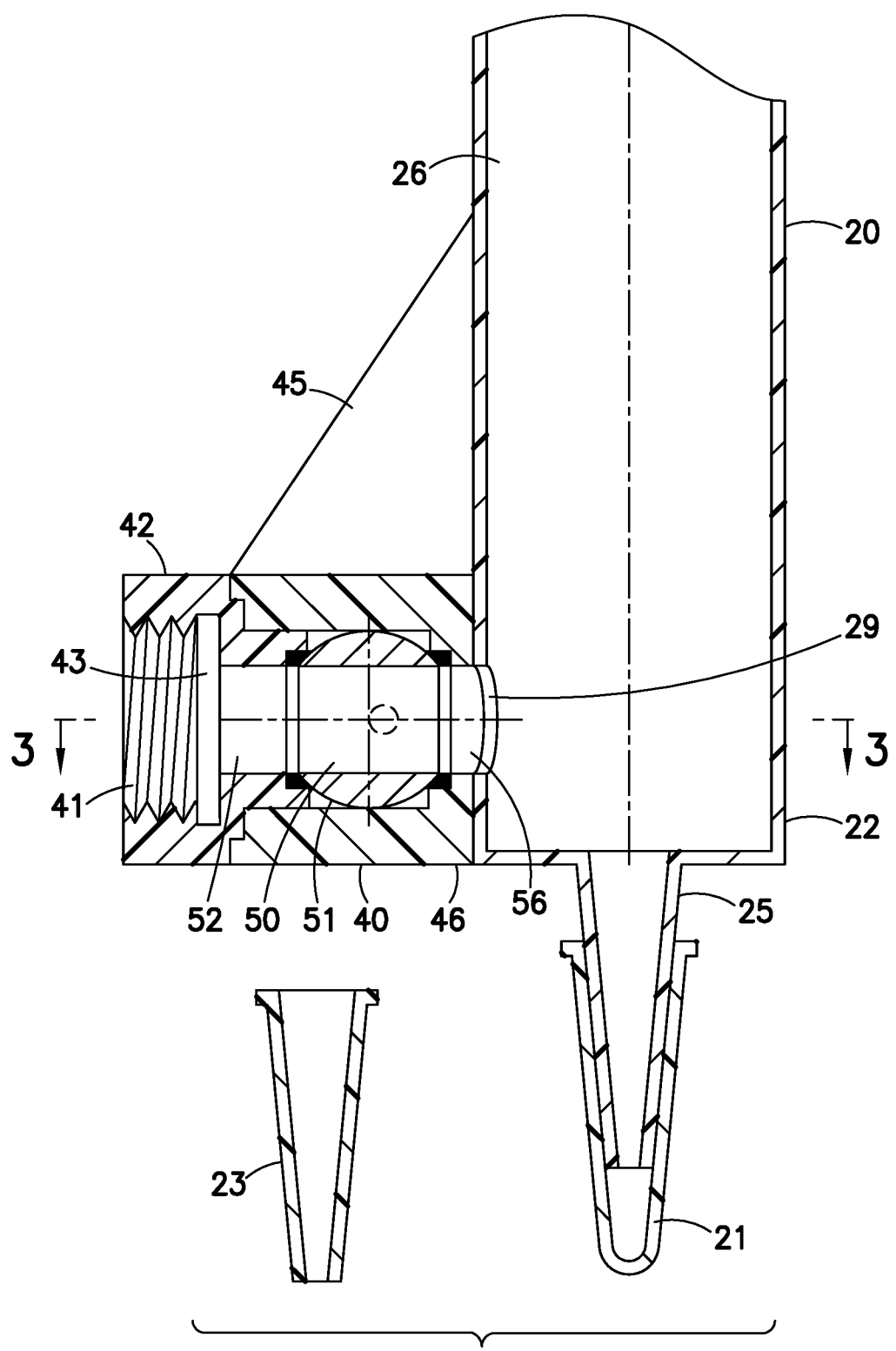
FIG. 2 is a side cross-sectional view of the syringe of the present invention with a valve in a housing illustrated in FIG. 1.
Figure 3:
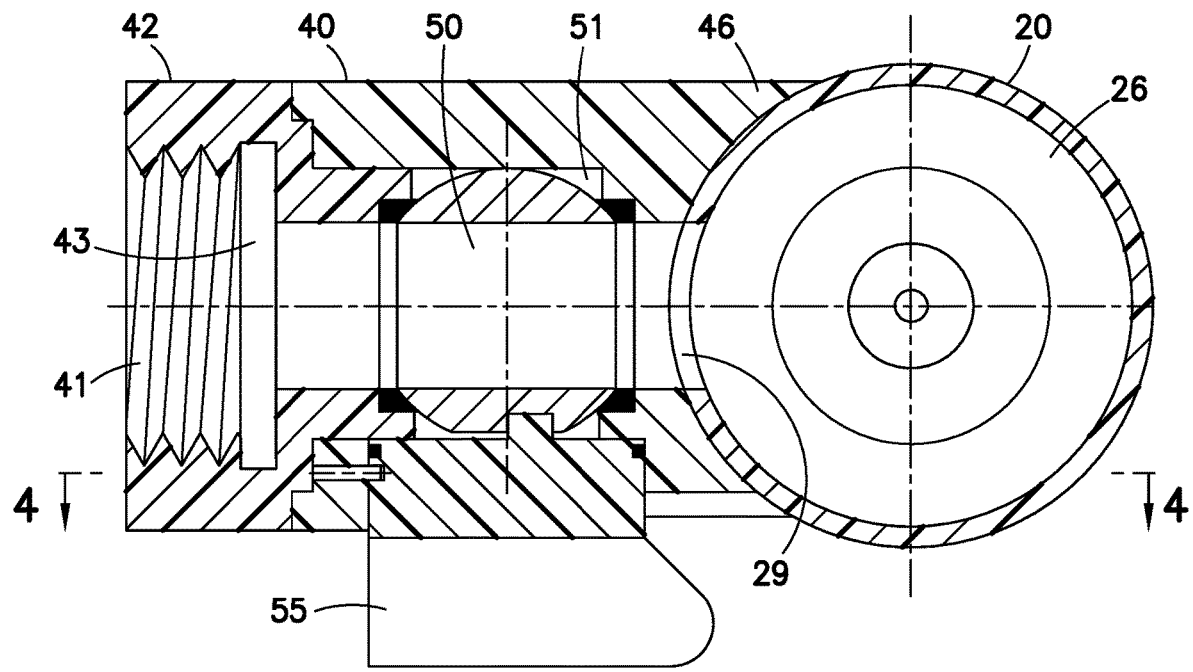
FIG. 3 is a top cross-sectional view of the syringe of the present invention with a valve in a housing illustrated in FIG. 2, along line 3-3.

The present invention is directed to an efficient, accurate novel syringe with a valve, contained in a housing connected to the syringe barrel and a method of use thereof. A preferred embodiment is shown in FIGS. 1 through 6. With reference to the drawings, and particularly FIGS. 1, 2 and 3, one embodiment of the invention comprises a syringe 10 with a barrel 20, which is an elongated tubular element with a longitudinal bore 26 therethrough. The barrel 20 had a proximal end 22 and a distal end 24, where the proximal end 22 terminates in a hollow tip 25. The syringe 10 is preferably a large volume syringe, such as one capable of measuring out and holding 1-100 ml of chemical concentrate. Larger syringe barrels, holding 150 ml or more may also be used. A longitudinally moveable plunger 30 is disposed inside the longitudinal bore 26 of the barrel 20. The plunger 30 has a plunger seal 32 and preferably also a plunger flange 34 and/or plunger ring 38. The plunger flange 34 or plunger ring 38 enables the user to more easily push the plunger 30 down or draw it up. The seal 32 is of a cooperating diameter with the longitudinal bore 26 so as to enable a substantially watertight connection between the plunger 30 and the barrel 20. The seal 32 is typically made from soft, expandable rubber in most syringe applications, or it can be silicone or plastic, molded into the plunger 30 itself, creating a sufficiently watertight seal against the interior of the barrel 20 (i.e., the longitudinal bore 26).

The plunger 30 preferably has a sufficient degree of movement so that the seal 32 can move substantially between the proximal end 22 (down position) and the distal end 24 (up position) of the barrel 20. The barrel 20 also preferably includes a barrel flange 28 at the distal end 24 that helps the user to hold the syringe 10 while drawing or pushing out the chemical concentrate. The barrel flange 28 or the distal end 24 should be of cooperating size with the plunger 30 to allow its unrestricted movement along the longitudinal bore 26, but should also preferably be of a diameter that is slightly smaller than the diameter of the longitudinal bore 26 to ensure the plunger 30 does not fall out of the barrel 20 when the seal 32 reaches the distal end 24 of the barrel 20. The barrel 20 preferably has volume notches or volume markings 70, which may be printed on or molded into the barrel 20 to enable the user to measure precise amounts of chemicals. The markings 70 should be specific, detailed, and graduated enough to enable the user to accurately and safely transfer the precise amount of chemicals from the bottle 60 (FIG. 7) to the barrel 20 of the syringe 10 and then to the correct mixing tank.

The syringe 10 also has a housing 40 which houses the valve 50 (FIG. 2) and enables fluid communication between the valve 50 and the chemical bottle 60 and between the valve 50 and the barrel 20 of the syringe 10, depending on the position of the valve 50. The housing 40 has a bottle cap 42, which is screwed on the mouth 62 of a bottle 60, and a mouth 46 that is coupled with the barrel 20. For the purpose of coupling the bottle cap 42 to the mouth 62 of the bottle 60, the bottle cap 42 has female threading 41, reciprocal to the male threading 61 on the mouth 62. The shape of the mouth 46 is preferably curved, cooperating with the diameter of the barrel 20 to enable a flush connection as illustrated in FIGS. 1-3. The mouth 46 of the housing 40 is attached to the barrel 20 by adhesive (such as glue or polymer resin), rails, thermal bonding, latches, reciprocal threading, or other means known in the art, preferably at or near the proximal end 22. The housing 40 is illustrated with an optional flange 45 in FIGS. 1-2. The flange 45 is longitudinally attached (by adhesive, rails, thermal bonding, latches, reciprocal threading, or other known means) to the exterior of the barrel 20, and the flange 45 reinforces the connection between the housing 40 and the barrel 20. The connection between the mouth 62 of the bottle 60 and the bottle cap 42 may be further insulated from leaks by an optional gasket 43 (FIGS. 2-3) between the mouth 62 and the valve 50.

The valve 50 is preferably held in place by the housing 40 being 3D printed around the valve 50 (any commercially available smooth plastic may be used for that purpose, such as PVC plastic). Alternatively, the housing 40 may be manufactured in several pieces by 3D printing or other methods known in the art such as injection molding or stamping, and then the pieces would be assembled, snapped, or screwed together. For example, as illustrated in FIGS. 5-6, the valve 50 may be inserted and secured inside the housing 40 by a valve adapter 51, and then the bottle cap 42 is screwed into the housing 40.

Figure 5:
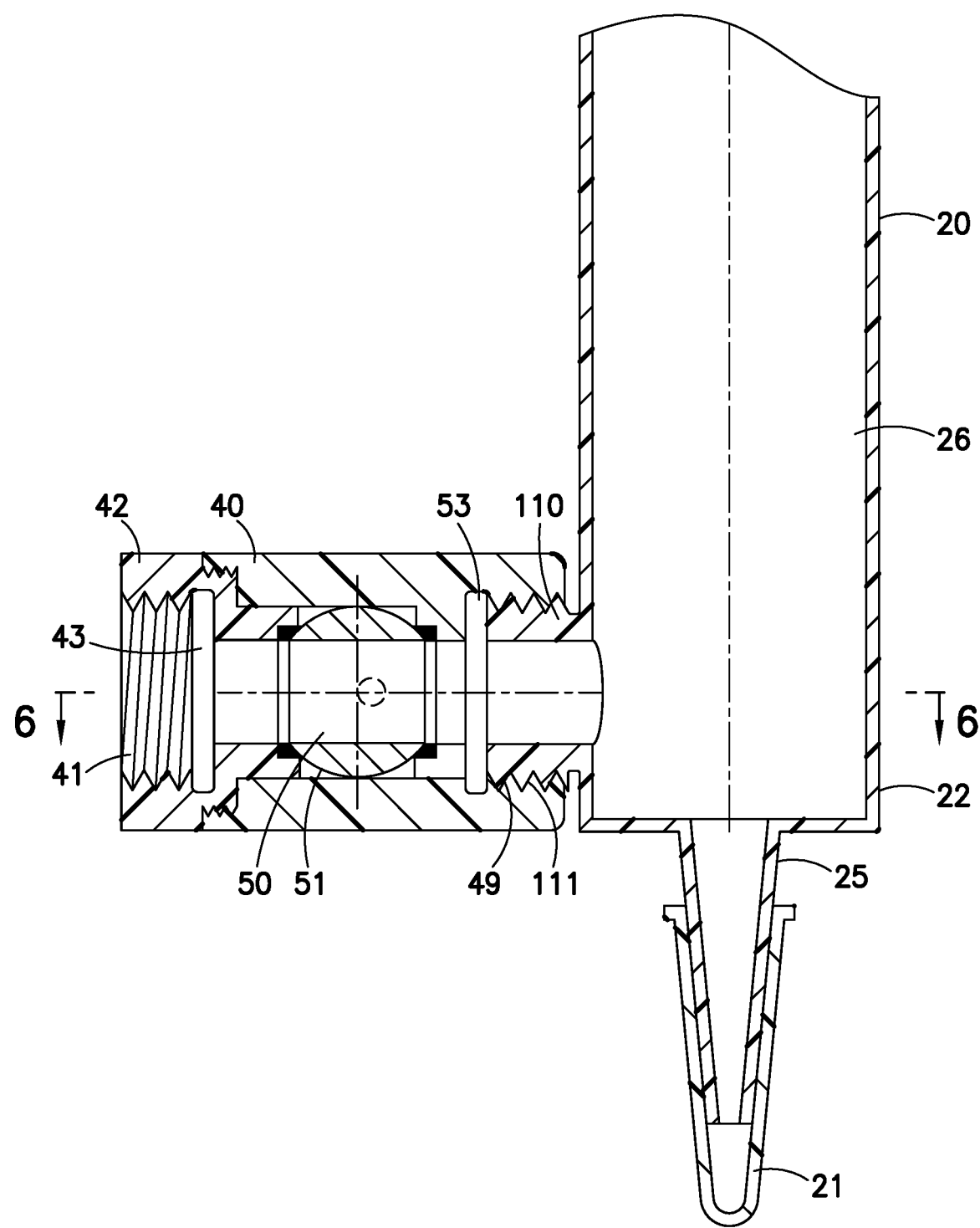
FIG. 5 is a side cross-sectional view of an alternative embodiment of the syringe of the present invention with a barrel protrusion and the housing with a valve connected to the protrusion.
Figure 6:
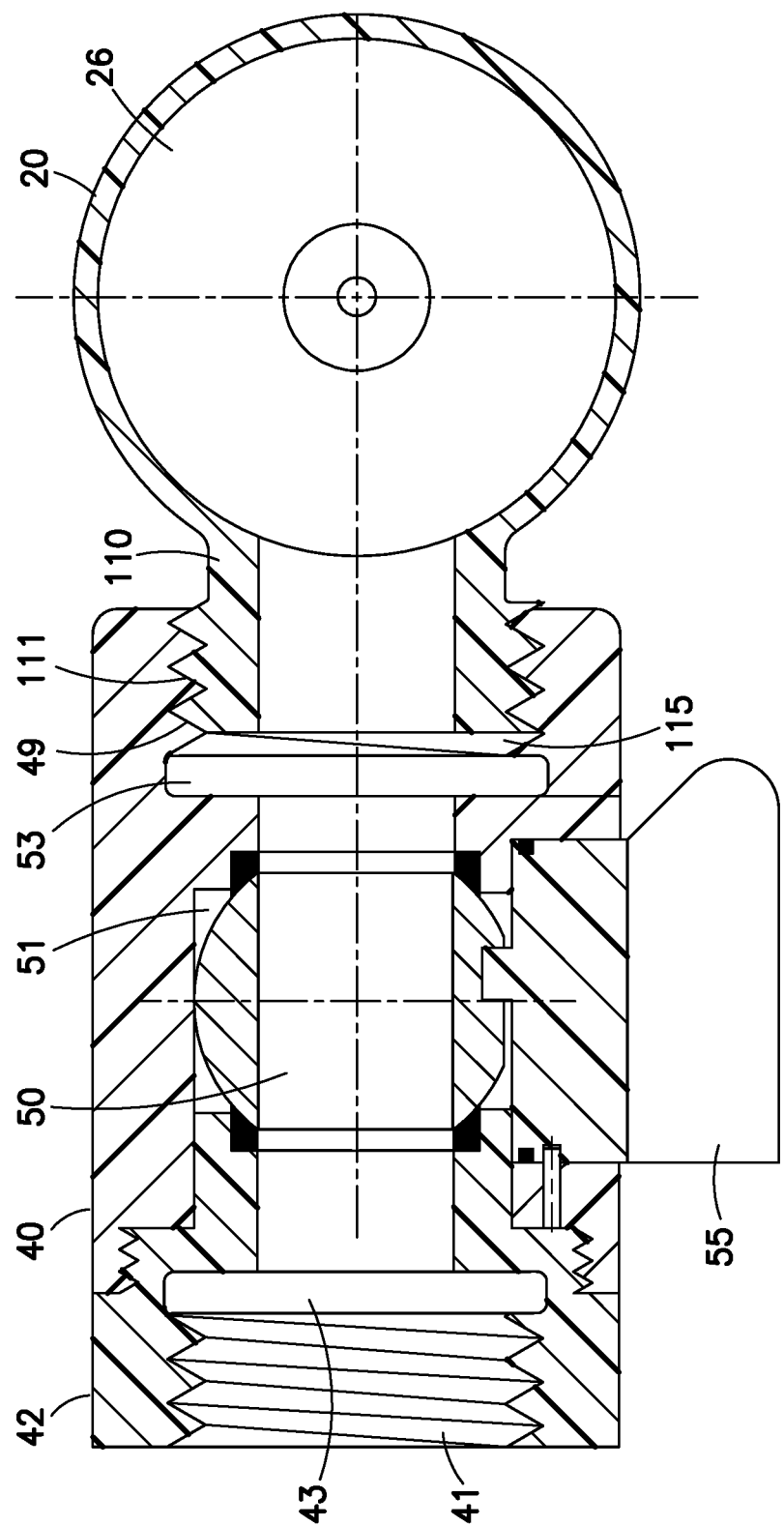
FIG. 6 is top cross-sectional view of the alternative embodiment of the syringe of the present invention with a protrusion illustrated in FIG. 5, along line 6-6.

As further illustrated in FIGS. 2, 5-6, there is preferably a gasket (rubber, silicone or any other suitable material) that secures the water-tight connection on both ends of the valve 50: the gasket 43 on the "A" side 52 of the valve 50 and the gasket 53 on the "B" side 56 of the valve 50. Both gaskets 43 and 53 are optional but are present in the preferred embodiment.

Alternatively, the housing 40 may be molded together with the barrel 20 of the syringe 10, which will ensure proper connection between the housing 40 and the barrel 20. In such an embodiment, the valve 50 is inserted and mounted in the housing 40 through the bottle cap 42 and secured inside the housing 40 by threading, adhesive, or a threaded ring that is screwed into the bottle cap 42 after the insertion of the valve 50. In this embodiment, the female threading 41 reciprocal to the male threading 61 on the mouth 62 of the bottle 60 may be mounted to housing 40 after the insertion and securing of the valve 50.

Figure 4:
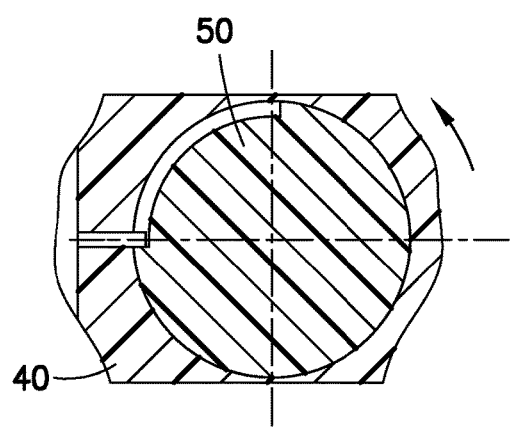
FIG. 4 is a side cross-sectional view of the valve in a housing illustrated in FIG. 3, along line 4-4.

The lever 55 of the valve 50 protrudes from the side of the housing 40 sufficiently so that it can be manually operated with the user's fingers. The user manipulates the lever 55 to open or close the valve 50, making it possible for the chemical concentrate to flow from the bottle 60 into the barrel 20 through the valve 50. The lever 55 will be mounted at the side of the housing 40, directly above the bottle cap 42, which is enable almost intuitive operation of the valve 50 by the user. The movement of the lever 55 and the consequent opening and closing of the valve 50 is illustrated in FIGS. 3-4.

Although a manual valve 50 is the preferred embodiment of the present invention, the Applicant envisions that an automatic valve may be employed within the scope and spirit of the present invention, for example switching automatically depending on the movement and the position of the plunger 30. In the embodiment employing one-piece barrel 20 and housing 40, the lever 55 is mounted onto the valve 50 after the valve 50 is inserted into the housing 40 through the bottle cap 42 and secured in place using the means described in this Application.

The barrel 20 has a hollow tip 25 coupled with the proximal end 22. Alternatively, the hollow tip 25 may be integrally formed with the barrel 20 at the proximal end 22, which is the easiest and cheapest way to manufacture the syringe barrel 20. The hollow tip 25 at the proximal end 22 is used to pour out or inject chemical concentrate from the syringe 10 into another bottle, container, or mixture. The hollow tip 25 may be of varying lengths as needed by the application. The hollow tip 25 is covered by a removable cap 21, which may be a friction cap, snap-on cap or a Luer lock cap. The removable cap 21 may be attached to the hollow tip 25 by a hinged collar 27. The hinged collar 27 is preferably made of a soft (bendable) material such as plastic. When the removable cap 21 is attached to the hollow tip 25, the connection is substantially water-tight.

Having replaceable tips 23 of different sizes would also enable the user to pour or inject the chemical concentrate into other bottles or spaces of varying sizes, where the user could attach the replaceable hollow tips 23 of the desired size to the hollow tip 25 (again, ether by snap-on, reciprocating threading, Luer lock, or friction connection) depending on the application. These methods of attachment allow the attachment of interchangeable replaceable tips 23 of varying lengths and sizes.

As illustrated in FIGS. 2-3, the barrel 20 of the hollow syringe 10 has an inlet port 29 on the side of the barrel 20, close to the proximal end 22.

The valve 50 is preferably a one-way (unidirectional) ball valve. The housing 40 is essentially a molded sleeve that holds the valve 50 and connects the exposed valve 50 to the mouth 62 of the chemical bottle 60 so that the bottle is in fluid communication with the valve 50. The housing 40 is screwed onto the mouth 62 of the bottle 60 to enable a watertight connection between the housing 40 and the bottle 60. The connection between the housing 40 and the barrel 20 of the syringe 10 also has to be watertight. The valve may be mounted with a ball valve adapter 51 (FIGS. 2-3).

The valve 50 is preferably a straight ball valve with two sides: the "A" side 52, which is held in the bottle cap 42, and the "B" side 56, which is held in the mouth 46 of the housing 40. When the lever 55 is aligned with the longitudinal axis of the valve 50 between the "A" side and the "B" side (and incidentally the longitudinal axis of the housing 40 as well), the ball valve 50 is open, ready to allow liquid chemicals into the barrel 20 of the syringe 10. When the lever 55 is perpendicular to the longitudinal axis, the valve 50 is closed, and the chemicals cannot be drawn into the barrel 20, but they can now be expelled from the hollow tip 25 when the plunger is depressed all the way, or part of the way, to the proximal end 22 of the barrel 20. The valve 50 can be a typical metal or even plastic ball valve; manufacturing it entirely from plastic may allow the entire assembly of the housing 40 and the valve 50 to be printed as one piece on a 3D printer. A hand wheel may be used instead of the lever 55 to open or close the ball valve 50, but for practical reasons and the ease of use the lever 55 is the preferred embodiment, which is also more frequently used in ball valves than a hand wheel.

The embodiment illustrated in FIGS. 1-7 uses a housing 40 that is mounted substantially perpendicularly along its longitudinal axis relative to the longitudinal axis of the barrel 20. That makes the barrel 20 of the syringe 10 substantially perpendicular to the vertical axis of the bottle 60 (i.e., a T-shape or L-shape). However, in order to improve the ease of storage and transportation of the bottle 60 with the syringe 10 attached, the housing 40 may be coupled to the barrel 20 so that it is inclined relative to the longitudinal axis of the barrel 20, preferably in the range between 5 and 45 degrees. This incline angle range is selected to enable easy storage and transportation, but other practically usable incline angle ranges are envisioned by this invention, depending on the size of the bottle 60 and the syringe 10.

In use, the bottle cap 42 is securely connected onto the mouth 62 of the bottle 60 after the manufacturer's cap is removed, using female threading 41 of the bottle cap 42, which is reciprocal to the male threading 61 on the mouth 62. That places the entire assembly, including the syringe 10, housing 40, and the valve 50 contained in the housing 40, on top of the bottle 60, replacing the manufacturer's cap. The valve 50 should be closed at this time to ensure that there is no spillage during the connection and that no air is pumped into the bottle 60 subsequently. A ball valve 50 is closed when the lever 55 is perpendicular to the longitudinal axis of the valve and housing 40.

Then, the cap 21 is removed from the hollow tip 25 (if it is still attached), and the plunger 30 is depressed all the way down, to the proximal end 22 of the barrel 20, pushing the air out of the barrel 20. The plunger 30 should come to rest when the seal 32 reaches the proximal end 22. The cap 21 is then replaced and fitted to the hollow tip 25. The lever 55 is operated to open the valve 50 and enable the fluid communication between the bottle 60 and the barrel 20 (the lever 55 will be in the position aligned with the longitudinal axis of the valve 50). The bottle 60 is then tilted or turned upside down to enable the viscous chemical concentrate to flow through valve 50 when the plunger 30 is retracted and the seal 32 creates a vacuum inside the barrel 20, drawing chemical concentrate into the barrel 20 through the bottle cap 42, the open valve 50, the mouth 46, and the inlet port 29. The plunger 30 is retracted back depending on the amount of the chemicals needed, which is visible in the syringe 10 and can be precisely measured using the volume marking 70.

When the required amount of chemical concentrate is drawn into the barrel 20, the user stops retracting the plunger 30 and closes the ball valve 50 by manually operating the lever 55 (the lever 55 will be in the position perpendicular to the longitudinal axis of the valve 50). The user then takes off the cap 21 and depresses the plunger 30 again, expelling the chemicals from the hollow tip 25 as needed to complete the pest control or extermination mixture.

Figure 7:
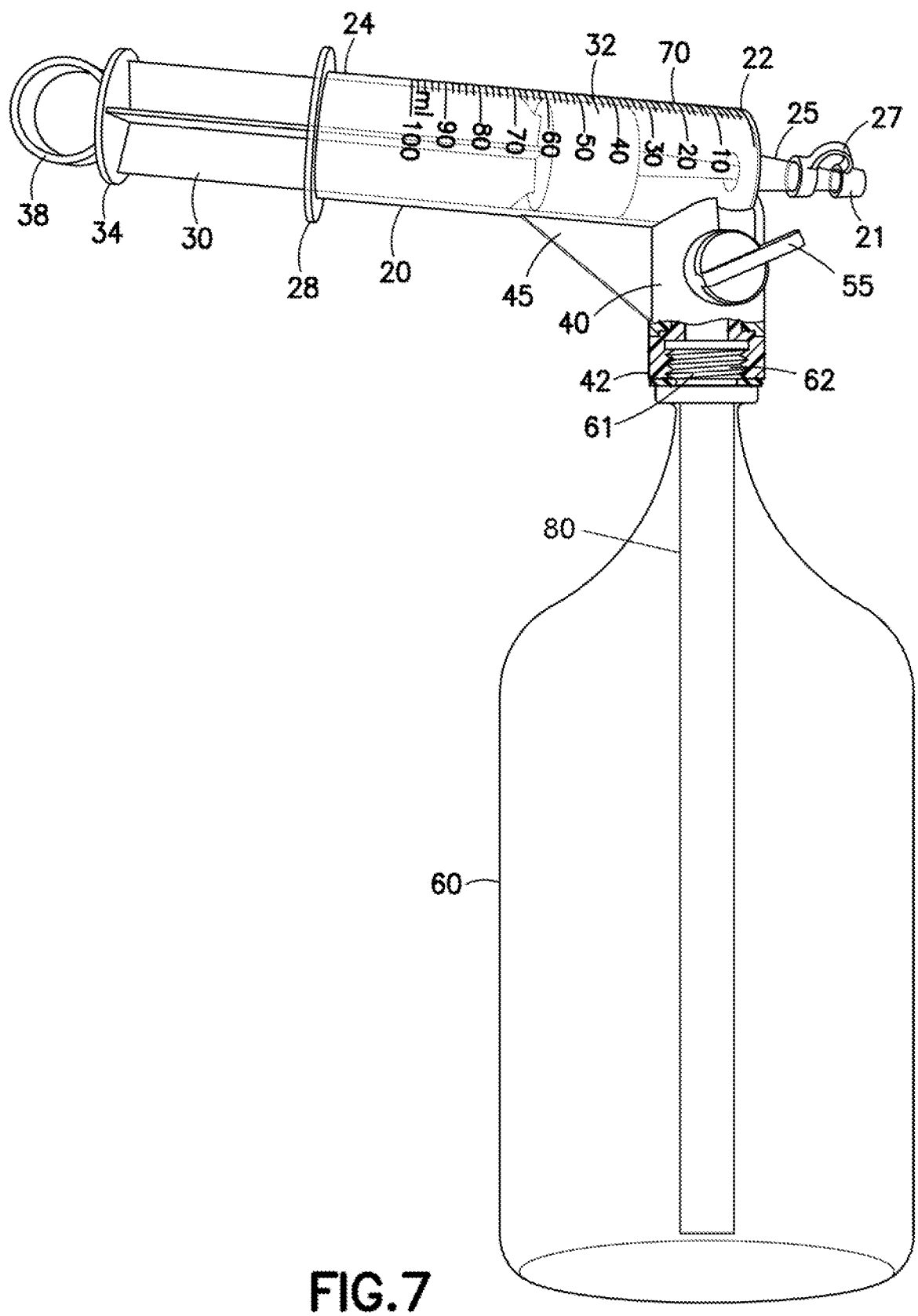
FIG. 7 is an isometric view of the syringe of the present invention with a valve in a housing illustrated in FIG. 1, connected to a concentrate bottle.

It should be noted that this sequence of steps is appropriate with the embodiment of the present invention where the housing 40 is directly connected to the bottle 60. If an optional siphon tube 80 is used, as illustrated in FIG. 7, there is no need to tilt the bottle 60 or turn it upside down. The siphon tube 80 may only be used without a sleeve connecting the mouth 62 with the bottle cap 42. The preferred embodiment of the present invention does not use a siphon tube 80 because of the difficulties associated with drawing concentrate through the tube: different viscosities of the concentrate, different heights of the bottles (i.e., the siphon tube of one length will not fit all bottles), etc.

It should also be noted that, in place of a ball valve, a ball and spring valve (sliding ball valve) may be used, which eliminates the need for a handle/lever 55. When the plunger 30 is retracted, the valve is open and the chemicals are drawn into the barrel 20. When the plunger 30 stops and is then depressed to expel the chemicals, the ball locks the opening of the ball and spring valve and prevents the chemicals from seeping back into the valve, so that they are expelled through the tip 25.

When the barrel 20 of the syringe 10 is fully depleted of the chemicals that have been poured or injected into the correct mixture, the seal 32 of the plunger 30 prevents any tiny drops remaining in the hollow tip 25 after the syringe 10 is emptied from dropping or falling out. Additionally, after the emptying of the barrel 20, the hollow tip should be covered by the removable cap 21.

The entire assembly of the syringe 10 and housing 40 with the valve 50 may be unscrewed from any finished or unfinished bottle of chemical concentrate and transferred to another bottle. However, the assembly does not have to be disturbed until there is a need to do so, and it may be used numerous times, including several times on the same call.

The syringe 10, including the barrel 20 and plunger 30, are preferably made from clear plastic, but the present invention may be implemented with other materials of sufficient transparency that are appropriate for overseeing the drawing of chemicals into the syringe 10.

Various other modifications may be added to the present invention as disclosed. For example, a handle or grip may be attached to the barrel 20 between the proximal end 22 and the distal end 24 to aid in the holding and directional positioning of the syringe 10, as well as the discharge of chemicals.

An alternative embodiment of the present invention uses a sleeve attached to the bottle cap 42 of the housing 40 on one end and the mouth 62 of the bottle 60 on the other end. In yet another alternative embodiment, there can be a siphon tube 80 that is inserted into the bottle 60 through the mouth 62, and reaches substantially the bottom 64 of the bottle 60. The siphon tube 80 is connected directly to the valve 50 or to the bottle cap 42. This embodiment may be used with both the sleeve and the sleeveless housing 40, and it eliminates the need to turn over or tilt the bottle 60, which may be undesirable in some instances.

In an alternative embodiment of the present invention illustrated in FIGS. 5-6, the barrel 20 has a hollow protrusion 110 at or near the proximal end 22 (essentially replacing the inlet port 29). The protrusion 110 has male threading 111 reciprocal to the female threading 49 on the mouth 46 of the housing 40. Forming the protrusion 110 as an integral part of the barrel 20 allows for an easier mounting and a better seal between the housing 40, containing the valve 50, and the barrel 20. An optional gasket 53 may be mounted in the mouth 46 of the housing 40, between the tip 115 of the protrusion 110 and the valve 50 to further prevent any leaks (FIG. 6). The gasket may be made from rubber, silicone, plastic, or other liquid-insulating materials known in the art.

The novel syringe with a valve in a housing and method for precisely measuring and pouring chemicals of the present invention have other possible uses in addition to pest control or extermination field. The novel syringe with a valve in a housing may be adapted for other fields as well.

The novel syringe with a valve in a housing of the present invention may also be used in larger-size or smaller-size applications, and more elaborate forms than those conventionally used for drawing chemical concentrate from a bottle for pest control purposes. It would be easy to use a valve of a different size and throughput and to calculate the exact dimensions of the valve versus the desired size of the syringe using the disclosure of the present invention.

The above description of the disclosed preferred embodiments is provided to enable any person skilled in the art to make or use the invention. Various modifications to these embodiments will be readily apparent to those skilled in the art, and the principles described herein can be applied to other embodiments without departing from the spirit or scope of the invention and the subject matter of the present invention, which is broadly contemplated by the Applicant. The scope of the present invention fully encompasses other embodiments that may be or become obvious to those skilled in the art.

What is claimed is:

1. A syringe with a valve for measuring chemicals comprising:
   (a) a barrel having a distal end and a proximal end and a longitudinal bore therethrough, said proximal end terminating in a hollow tip in fluid communication with the longitudinal bore and said barrel having an inlet port near the proximal end;
   (b) a longitudinally movable plunger disposed inside the longitudinal bore, said plunger having a plunger seal on one end of a cooperating diameter with the longitudinal bore to enable a substantially watertight connection between the plunger and the barrel, wherein the seal is selectively movable between the proximal end and the distal end by moving the plunger;
   (c) a housing having a mouth attached to the barrel over the inlet port and a reciprocally-threaded and cooperatively-sized bottle cap for coupling the housing to a mouth of a bottle containing chemicals, wherein the mouth is cooperatively curved for flush connection to the barrel over the inlet port;
   (d) a manual valve disposed in the housing, enabling fluid communication between the barrel and the bottle containing chemicals, said valve having a lever protruding outside the housing, the lever being selectively operable to open or close the valve; and
   (e) a removable cap selectively attachable to the hollow tip, enabling a substantially water-tight connection between the hollow tip and the removable cap, wherein the syringe is filled with chemicals from the bottle containing chemicals when the bottle cap is coupled to the mouth of the bottle containing chemicals, the removable cap is attached to the hollow tip, the lever is operated to open the valve, the bottle containing chemicals is tilted or turned upside down, and the plunger is retracted from the proximal end to the distal end, creating a vacuum in the longitudinal bore and drawing the chemicals into the barrel.

2. The syringe of claim 1, wherein the chemicals are discharged from the syringe when the lever is operated to close the valve, the removable cap is detached from the hollow tip, and the plunger is depressed from the distal end to the proximal end, creating pressure in the longitudinal bore and expelling the chemicals from the hollow tip.

3. The syringe of claim 1, further comprising a plunger flange or plunger ring on an end of the plunger opposite to the seal.

4. The syringe of claim 1, further comprising a barrel flange near the distal end of the barrel to help a user hold the syringe.

5. The syringe of claim 4, wherein the barrel flange is of a cooperating size with the plunger and the seal, allowing unrestricted movement of the plunger along the longitudinal bore but preventing the plunger from falling out when the seal reaches the distal end.

6. The syringe of claim 1, wherein the seal is made of rubber, plastic or silicone.

7. The syringe of claim 1, wherein the valve is a unidirectional ball valve.

8. The syringe of claim 1, wherein the barrel includes volume notches molded into the barrel or volume markings printed on the barrel for measuring precise amounts of chemicals.

9. The syringe of claim 1, wherein the removeable cap is selected from the group consisting of: friction cap, snap-on cap, reciprocating threading cap, and a Luer lock cap.

10. The syringe of claim 1, wherein the mouth is attached to the barrel by adhesive, rails, thermal bonding, latches, or reciprocal threading.

11. The syringe of claim 1, wherein the housing includes a flange longitudinally attached to an exterior of the barrel, reinforcing a connection between the housing and the barrel.

12. The syringe of claim 1, wherein the housing includes a gasket between the valve and the mouth of the bottle containing chemicals to prevent leaks.

13. The syringe of claim 1, wherein the housing includes a gasket between the valve and the barrel to prevent leaks.

14. The syringe of claim 1, wherein the housing is 3D printed or injection molded.

15. The syringe of claim 1, wherein the valve is secured in the housing by reciprocal threading, adhesive or a threaded ring.

16. The syringe of claim 1, further comprising a valve adapter disposed in the housing to hold the valve.

17. The syringe of claim 1, wherein the removable cap is attached to the hollow tip by a hinged collar.

18. The syringe of claim 1, further comprising at least one replaceable tip of a different fluid throughput than the hollow tip, capable of being removably attached to the hollow tip.

19. The syringe of claim 1, further comprising a siphon tube connected to the valve or the bottle cap for drawing chemicals from the bottle containing chemicals.

20. A syringe with a valve for measuring chemicals comprising:
   (a) a barrel having a distal end and a proximal end and a longitudinal bore therethrough, said proximal end terminating in a hollow tip in fluid communication with the longitudinal bore and said barrel having a treaded hollow protrusion near the proximal end;
   (b) a longitudinally movable plunger disposed inside the longitudinal bore, said plunger having a plunger seal on one end of a cooperating diameter with the longitudinal bore to enable a substantially watertight connection between the plunger and the barrel, wherein the seal is selectively movable between the proximal end and the distal end by moving the plunger;
   (c) a housing having a mouth attached to the hollow protrusion by reciprocal threading and a reciprocally-threaded and cooperatively-sized bottle cap for coupling the housing to a mouth of a bottle containing chemicals;
   (d) a manual valve disposed in the housing, enabling fluid communication between the barrel and the bottle containing chemicals, said valve having a lever protruding outside the housing, the lever being selectively operable to open or close the valve; and (e) a removable cap selectively attachable to the hollow tip, enabling a substantially water-tight connection between the hollow tip and the removable cap, wherein the syringe is filled with chemicals from the bottle containing chemicals when the bottle cap is coupled to the mouth of the bottle containing chemicals, the removable cap is attached to the hollow tip, the lever is operated to open the valve, the bottle containing chemicals is tilted or turned upside down, and the plunger is retracted from the proximal end to the distal end, creating a vacuum in the longitudinal bore and drawing the chemicals into the barrel.

21. The syringe of claim 20, wherein the chemicals are discharged from the syringe when the lever is operated to close the valve, the removable cap is detached from the hollow tip, and the plunger is depressed from the distal end to the proximal end, creating pressure in the longitudinal bore and expelling the chemicals from the hollow tip.

22. The syringe of claim 20, further comprising a plunger flange or plunger ring on an end of the plunger opposite to the seal.

23. The syringe of claim 20, further comprising a barrel flange near the distal end of the barrel to help a user hold the syringe.

24. The syringe of claim 23, wherein the barrel flange is of a cooperating size with the plunger and the seal, allowing unrestricted movement of the plunger along the longitudinal bore but preventing the plunger from falling out when the seal reaches the distal end.

25. The syringe of claim 20, wherein the seal is made of rubber, plastic or silicone.

26. The syringe of claim 20, wherein the valve is a unidirectional ball valve.

27. The syringe of claim 20, wherein the barrel includes volume notches molded into the barrel or volume markings printed on the barrel for measuring precise amounts of chemicals.

28. The syringe of claim 20, wherein the removable cap is selected from the group consisting of: friction cap, snap-on cap, reciprocating threading cap, and a Luer lock cap.

29. The syringe of claim 20, wherein the housing includes a gasket between the valve and the mouth of the bottle containing chemicals to prevent leaks.

30. The syringe of claim 20, wherein the housing includes a gasket between the valve and the hollow protrusion to prevent leaks.

31. The syringe of claim 20, wherein the housing is 3D printed or injection molded.

32. The syringe of claim 20, wherein the valve is secured in the housing by reciprocal threading, adhesive or a threaded ring.

33. The syringe of claim 20, further comprising a valve adapter disposed in the housing to hold the valve.

34. The syringe of claim 20, wherein the removable cap is attached to the hollow tip by a hinged collar.

35. The syringe of claim 20, further comprising at least one replaceable tip of a different fluid throughput than the hollow tip, capable of being removably attached to the hollow tip.

36. The syringe of claim 20, further comprising a siphon tube connected to the valve or the bottle cap for drawing chemicals from the bottle containing chemicals.

* * * * *